(12) United States Patent
Nakamura et al.

(10) Patent No.: US 12,435,358 B2
(45) Date of Patent: Oct. 7, 2025

(54) METHOD FOR SCREENING COMPOUND FOR CONTROLLING RNA FUNCTION

(71) Applicant: Veritas In Silico Inc., Tokyo (JP)

(72) Inventors: Shingo Nakamura, Tokyo (JP); Ling Jin, Tokyo (JP); Amiu Shino, Tokyo (JP); Takashi Kamimura, Tokyo (JP)

(73) Assignee: Veritas In Silico Inc., Tokyo (JP)

( * ) Notice: Subject to any disclaimer, the term of this patent is extended or adjusted under 35 U.S.C. 154(b) by 579 days.

(21) Appl. No.: 16/980,245

(22) PCT Filed: Mar. 14, 2019

(86) PCT No.: PCT/JP2019/010571
§ 371 (c)(1),
(2) Date: Sep. 11, 2020

(87) PCT Pub. No.: WO2019/177103
PCT Pub. Date: Sep. 19, 2019

(65) Prior Publication Data
US 2021/0032688 A1   Feb. 4, 2021

(30) Foreign Application Priority Data
Mar. 15, 2018 (JP) ................. 2018-047749

(51) Int. Cl.
| | | |
|---|---|---|
| C12Q 1/6818 | (2018.01) | |
| C12N 15/113 | (2010.01) | |
| C12Q 1/6806 | (2018.01) | |
| C12Q 1/6876 | (2018.01) | |
| G16B 5/20 | (2019.01) | |
| G16B 15/00 | (2019.01) | |
| G16B 25/10 | (2019.01) | |
| G16B 25/20 | (2019.01) | |
| G16B 30/00 | (2019.01) | |
| G16B 30/10 | (2019.01) | |

(52) U.S. Cl.
CPC ......... *C12Q 1/6818* (2013.01); *C12N 15/113* (2013.01); *C12Q 1/6806* (2013.01); *C12Q 1/6876* (2013.01); *G16B 5/20* (2019.02); *G16B 15/00* (2019.02); *G16B 30/00* (2019.02); *G16B 25/10* (2019.02); *G16B 25/20* (2019.02); *G16B 30/10* (2019.02)

(58) Field of Classification Search
None
See application file for complete search history.

(56) References Cited

U.S. PATENT DOCUMENTS

| | | |
|---|---|---|
| 2009/0019042 A1 | 1/2009 | Nakamura et al. |
| 2010/0063745 A1 | 3/2010 | Nakamura |
| 2020/0248177 A1 | 8/2020 | Kamimura et al. |

FOREIGN PATENT DOCUMENTS

| | | |
|---|---|---|
| EP | 1816191 A1 | 8/2007 |
| EP | 2096567 A1 | 9/2009 |
| WO | WO 2006/054788 A1 | 5/2006 |
| WO | WO 2008/072713 A1 | 6/2008 |
| WO | WO 2011/062166 A1 | 5/2011 |
| WO | WO 2019/044974 | 3/2019 |

OTHER PUBLICATIONS

Uzilov AV. BMC Bioinformatics 7: 173. pp. 1-30. (Year: 2006).*
Wiese KC. Comparison of P-RnaPredict and mfold—algorithms for RNA secondary structure prediction. Bioinformatics 22(8): 934-942. (Year: 2006).*
Cuff JA. JPred: a consensus secondary structure prediction server. Bioinformatics 14(10): 892-893. (Year: 1998).*
Angelbello et al., "Using Genome Sequence to Enable the Design of Medicines and Chemical Probes", Chemical Reviews, vol. 118, pp. 1599-1663, (2018).
Barros et al., "Recognition of Nucleic Acid Junctions Using Triptycene-Based Molecules", Angewandte Communications, vol. 53, pp. 13746-13750, (2014).
Nakamura, "A Novel Virtual Spectrometry: Visualized Regulatory Motifs on ADM, rPolβ and CD83 mRNAs in Human-friendly Manners", Journal of Biochemistry, vol. 146, No. 2, pp. 251-261, (2009).
International Preliminary Report on Patentability and Written Opinion received in PCT Application No. PCT/JP2019/010571 (FP19-750PCT) mailed Sep. 24, 2020.
International Search Report received in PCT Application No. PCT/JP2019/010571 (FP19-750PCT) mailed Jun. 11, 2019.
Connelly et al: "The Emerging Role of RNA as a Therapeutic Target for Small Molecules", Cell Chemical Biology, vol. 23, No. 9, Sep. 1, 2016, pp. 1077-1090.
Extended European Search Report in European Patent Application No. 19768245.3 dated Nov. 15, 2021.
Shapiro et al: "Bridging the gap in RNA structure prediction", Current Opinion in Structural Biology, vol. 17, No. 2, Apr. 17, 2007, pp. 157-165.

* cited by examiner

*Primary Examiner* — Olivia M. Wise
*Assistant Examiner* — Robert J. Kallal
(74) *Attorney, Agent, or Firm* — KNOBBE, MARTENS, OLSON & BEAR, LLP

(57) ABSTRACT

A method for screening for a compound capable of modulating gene expression by calculating an existence probability of a local secondary structure that may exist in a target RNA sequence; selecting a local secondary structure with the desired existence probability; preparing a screening probe corresponding to the selected local secondary structure; and screening for the compound using the probe.

1 Claim, 7 Drawing Sheets
Specification includes a Sequence Listing.

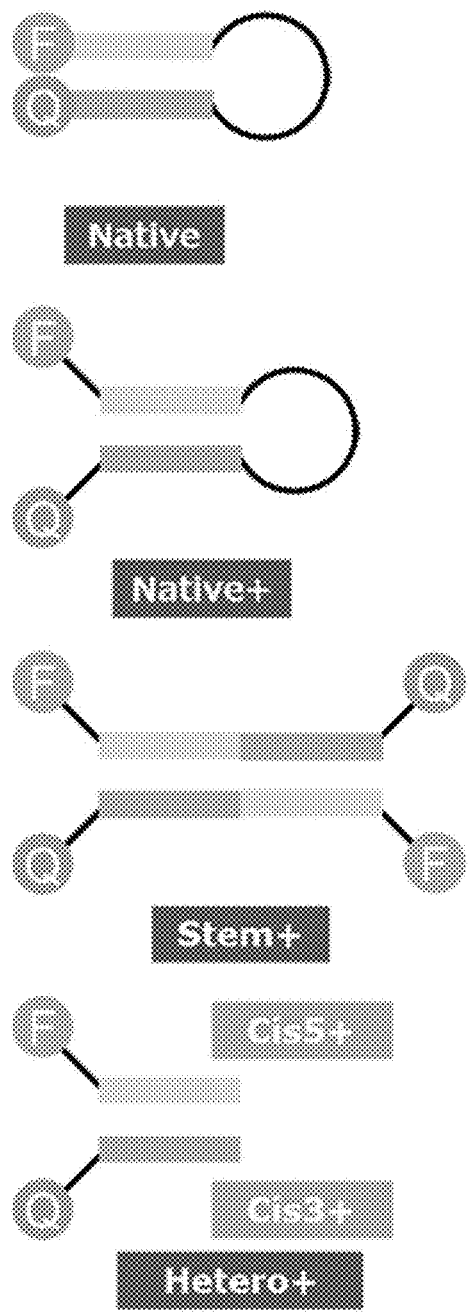
[Fig. 1]

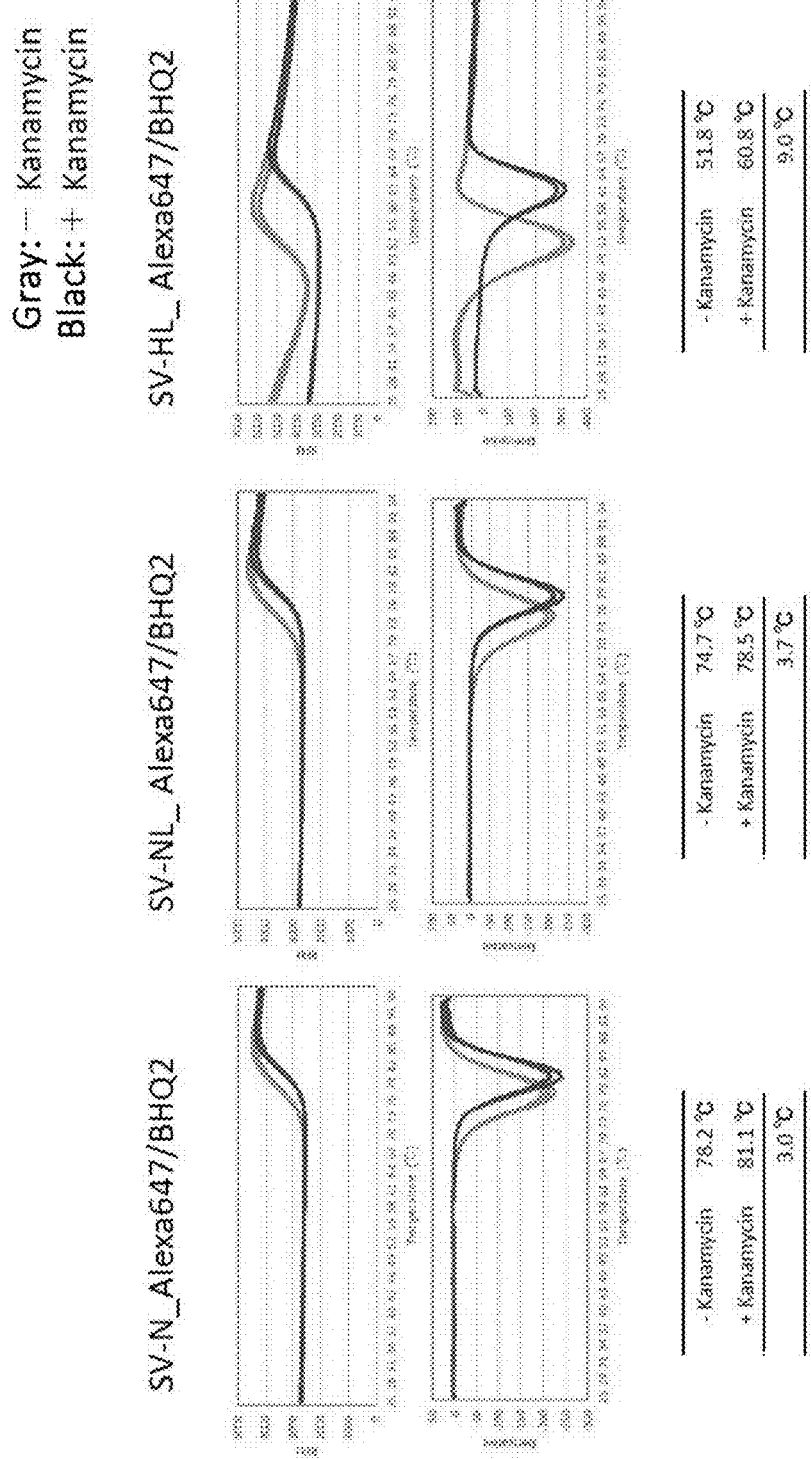
[Fig. 2]

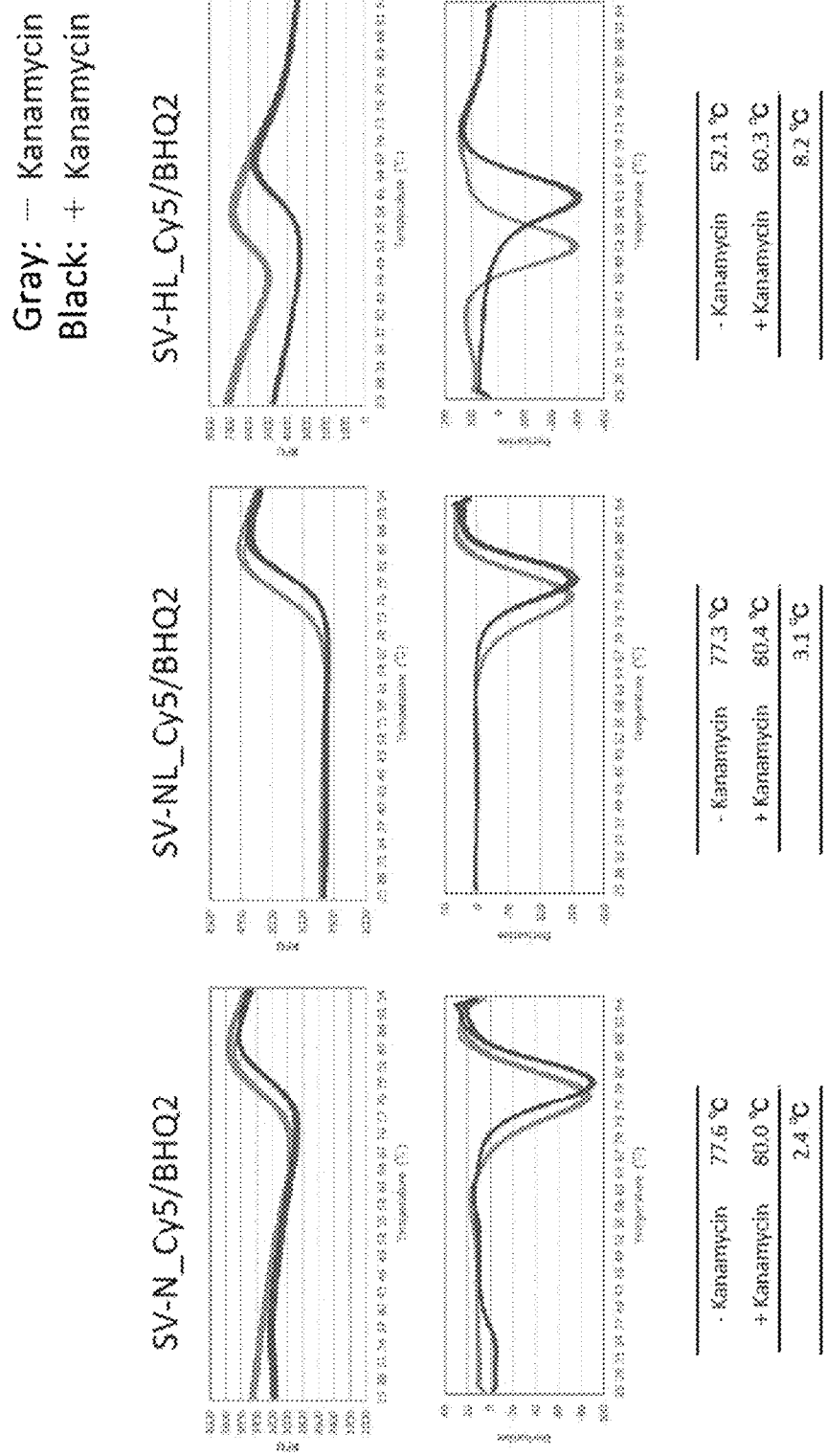
[Fig. 3]

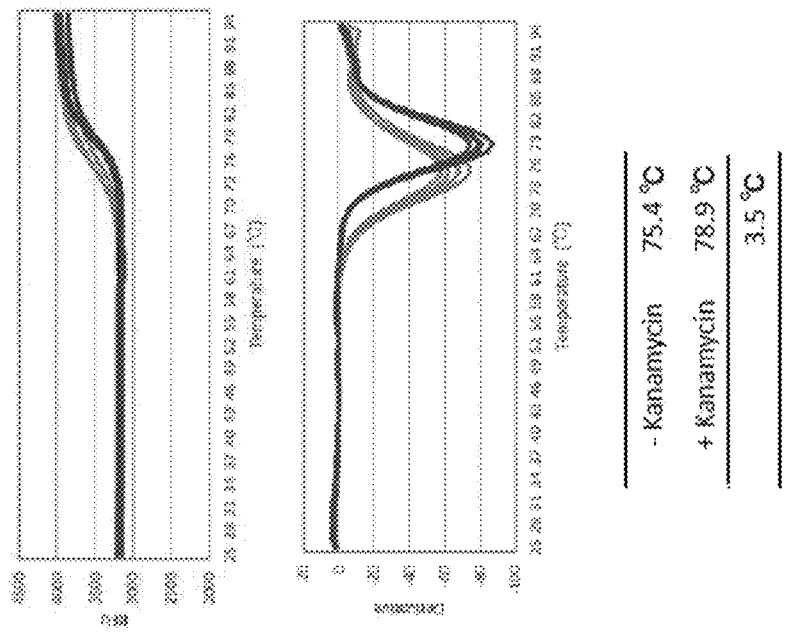
[Fig. 4]

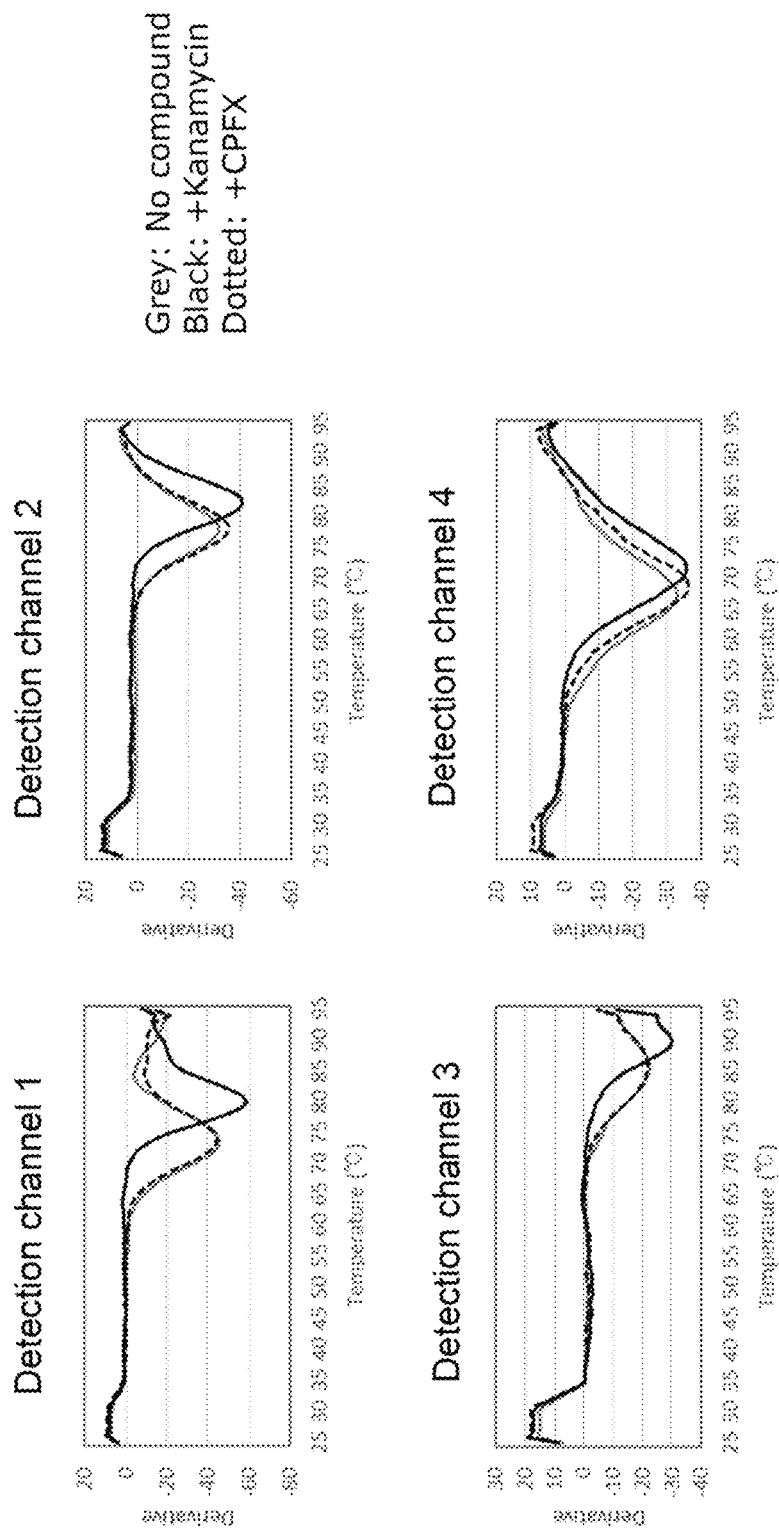
[Fig. 5]

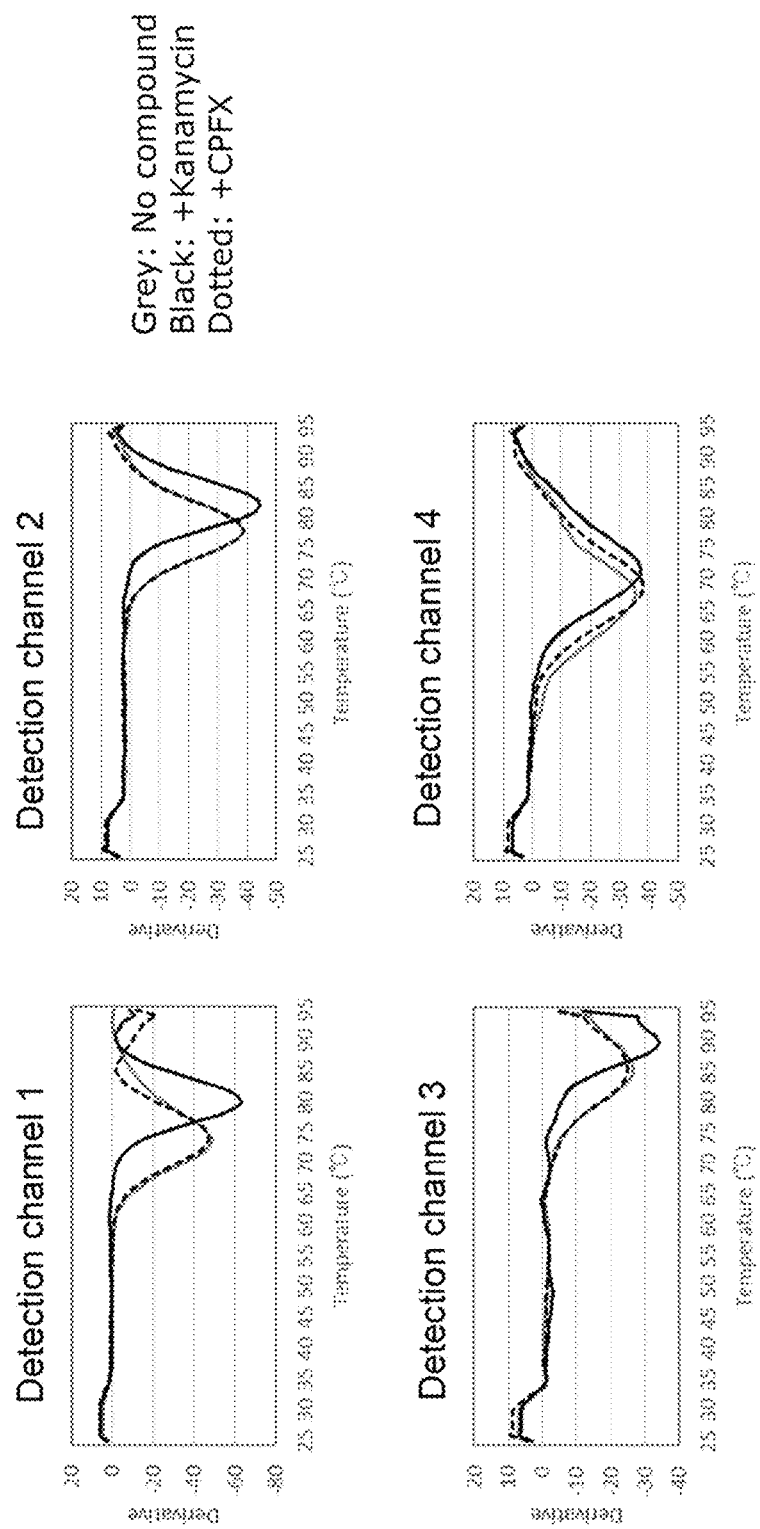
[Fig. 6]

[Fig. 7]
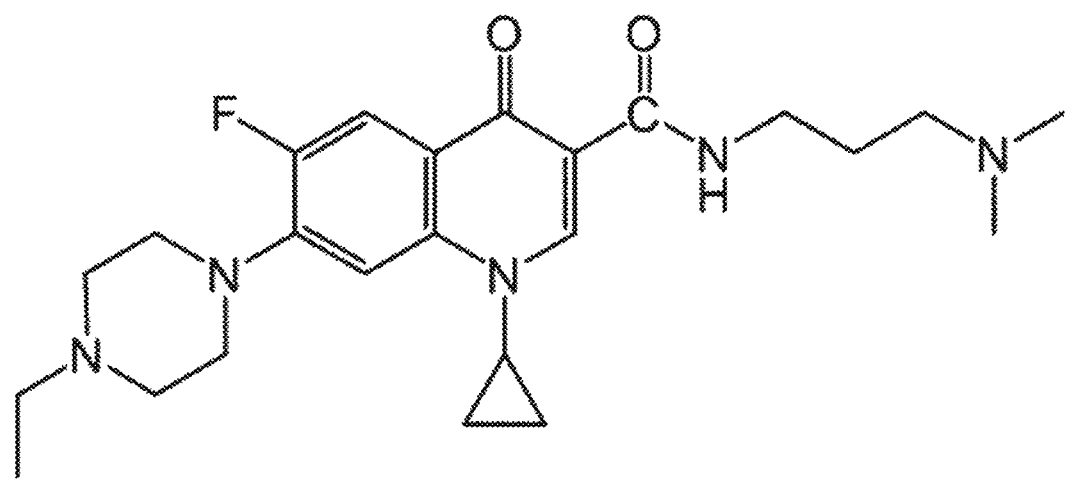

METHOD FOR SCREENING COMPOUND FOR CONTROLLING RNA FUNCTION

CROSS-REFERENCE TO RELATED APPLICATIONS

The present application is an application claiming the benefit of priority to JP 2018-47749 (filing date: Mar. 15, 2018), which is incorporated herein by reference in its entirety.

TECHNICAL FIELD

The present invention relates to a method for screening compounds which control RNA functions. More specifically, the present invention relates to a screening method for compounds capable of regulating translation of certain mRNAs, specifically mRNAs of genes in which proteins encoded thereof are involved in disease onset or development, in particular, compounds which have an advantage as pharmaceuticals such as hydrophobic low-molecular-weight compounds; and a method of selecting mRNA target sites the compounds could bind, as well as tools therefor, in particular, those related to computer software and such.

BACKGROUND ART

Among nucleic acid as drug targets, small molecules as RNA binding molecules have in fact had a long history in drug discovery research for ling time. For example, the mechanism of action of some antibiotics is known to inhibit protein synthesis by targeting bacterial rRNA. However, most of the target molecules of conventional small molecule drugs are proteins, and RNA is not considered as a promising target molecule in drug discovery. This could be attributed to: (i) RNA molecules are key signaling molecules in the central dogma, and therefore their functions are essential and simple, and lack the diversity required for drug discovery targets; and (ii) RNA molecules are considered not to have a druggable site that small compounds could bind because they are less likely to form stable three-dimensional structures. On the other hand, diverse functions of RNA such as ncRNA have been revealed in recent years, and RNAs related to many disease have been found. Moreover, a number of examples of low-molecular-weight compounds controlling RNA functions have been reported from riboswitch structural analysis and mechanistic analysis of hit compounds in phenotypic screening which is a cellular-level screen. In addition, although it is true that nucleic acid monomers are less diverse with respect to amino acid monomers, the interacting patterns of nucleic acid molecules are highly diverse and never inferior to proteins in the diversity of interactions with low-molecular-weight compounds, as nucleic acid monomers each have four interacting moieties in their respective interactions: the Watson-Click face, the Hoogsteen face, the Sugar edge face, and the aromatic surface. Indeed, it also supports that nucleic acid molecules such as aptamers confer high affinity to the target, even compared to antibodies. With the emerging knowledge of RNA research in both biological and chemical aspects, there is noticed to review RNA as a target for small molecule drug discovery.

Disney M D et al. have published drug discovery on use of repeating motif structures of microRNA precursors and RNAs of which RNA secondary structures have been analyzed as binding sites for small molecules (Non-patent Document 1); however, limited microRNAs are available as drug discovery targets, which lack diversity as a group of druggable targets for treatment of many diseases.

Arrakis Therapeutics is also advancing drug discovery based on its riboswitch motifs by using the riboswitch structure in mRNA as a binding site for small molecules and finding the scaffolds that binds to the site (Non-patent Document 2), but there is a very low probability of identifying a riboswitch structure that can be exploited as a drug discovery target among mRNAs, which limits the mRNA as a drug discovery target, resulting in insufficient diversity.

On the other hand, Nakamura and et al. found that the amount of translation is affected by locally stabilizing the simple stem-loop structures among mRNAs (presentation at the RNA Conference). There, the secondary structure (stem-loop structure) was predicted and searched from the data of native mRNA sequences by pattern matching; and a comprehensive search was conducted for sites in which development of low-molecular-weight drugs is possible, and drug discovery was actually carried out for the sites (Patent Document 1). In other words, a "method" program (named "multisl.pl" program) was developed to exhaustively search the human cDNA database for 2D structures to which conventional hydrophobic low-molecular compounds can bind. However, this program computes a large number of secondary structures with the desired features from the enormous amount of data because the search is aimed to improve coverage by using algorithms of dynamic programming, and it is not efficient in the drug discovery research process.

CITATION LIST

Patent Documents

Patent Document 1: WO2006/054788

Non-Patent Documents

Non-patent Document 1: Chem Rev. 2018 Jan. 11. [Epub ahead of print] Using Genome Sequence to Enable the Design of Medicines and Chemical Probes. Angelbello A J, Chen J L, Childs-Disney J L, Zhang P, Wang Z F1, Disney M D.

Non-patent Document 2: Angew Chem Int Ed Engl. 2014; 53(50):13746-50. Recognition of nucleic acid junctions using triptycene-based molecules. Barros S A1, Chenoweth D M.

SUMMARY OF THE INVENTION

Problems to be Solved by the Invention

For example, when an mRNA with the defined function is selected as the target for drug discovery, the present invention is to provide a means of searching for local secondary structures (motifs) in which low-molecular-weight compounds selectively bind to the mRNA of interest, and to screen for low-molecular-weight compounds that bind only to motifs found using this means in vitro to provide a small molecule drug that exerts a pharmacological effect by controlling the desired function, e.g., mRNA translation.

Means for Solving the Problems

In solving the above objectives, the precision and reliability of existing RNA secondary structure prediction programs, such as those represented by mfold (refer to GCG Software; Proc. Natl. Acad. Sci. USA, 86:7706-10 (1989)), are significantly reduced when dealing with large (e.g., >3000 bases) RNA strands. The reason is that mfold does not predict higher-order structures by any physical properties of RNA strands, but only by pattern matching. That is, the entropic disadvantage by pairing of the intramolecular RNA strands far in distance on the identical mRNA strand is neglected, and often stems are forced to be formed far in distances. Even if there are such distant pairings in the in vitro systems, it is unlikely that their pairings exist in vivo. Of course, such pattern matching techniques are sufficiently meaningful for assessing local structures (≤100 bases) (because of the low entropy loss due to pairing in the case of local structures). However, when one wants to know the structure of a long mRNA, there are many disadvantages in dealing with simply local structures, as there is little meaning in using mfold and the output format is not suitable for comprehensive search. The reason is that mfold is a design program dedicated to secondary structure prediction, and therefore analysis of the motif structure prediction results necessary for drug discovery research requires other techniques.

Specifically, the present inventors selected a stem-loop structure as the desired motif, input parameters of a particular stem-loop structure, implemented multiple RNA conformation analysis programs, searched and extracted sequences within the molecule that could serve as the structure from mRNA sequences, and extracted sequences to select a particular transcript (e.g., Survivin-encoding mRNA group) and a particular target sequence in the mRNA, based on the existing molecular position of the stem-loop structure (e.g., near the start codon) in the mRNA which has significance to be developed as a drug discovery target in a disease of interest. In addition, the specificity of the selected target sequence was confirmed by implementing the above program and searching the mRNA dataset to check that the target sequence is not present in regions involved in the translational control of other mRNAs, and a target sequence in which the low-molecular-weight compound can bind specifically was successfully obtained thereby.

The present inventors have also succeeded in constructing an assessment system in which RNA strands comprising a particular sequence obtained as described above are contacted with test compounds, and changes in the stability of the stem-loop structure of the RNA strands in the presence and absence of the test compounds are measured and compared, thereby screening for compounds capable of stabilizing the stem-loop structure to control the function of a transcript having the sequence, for example, mRNA translation.

The present inventors have performed further examination based on these findings, thereby completed the present invention.

One objective of the present invention is to provide a low-molecular-weight compound targeting a nucleic acid for modulating gene expression, and a method for treating a disease using the same. Further, another objective of the present invention includes identification of a motif region to be target of a low-molecular-weight compound for modulating gene expression, and a screening system for obtaining of the low-molecular-weight compound and designing of a probe therefor.

For the intrinsic substructure of the target mRNA, the present inventors intended to inhibit formation of the initiation complex of the translation by thermodynamically stabilizing it, to trigger ribosomal stalling or cleavage by endo-nucleases or to inhibit degradation by exo-nucleases, to cause rapid degradation of the mRNA by the mRNA quality-control mechanism (no-go decay) which degrades mRNA from which the translation elongation reaction has stalled, thus regulating protein expression from the target mRNA. Since its thermodynamic stabilization is carried out by conjugation with a low-molecular-weight compound, the first step is to discover a suitable substructure to which a low-molecular-weight compound can bind at an appropriate position. RNA probes are then designed in a system that can be detected to properly stabilize their substructures, characterized, and used in the evaluation system to obtain low-molecular-weight compounds that bind. The present invention is based on such a technique developed by the present inventors and encompasses the embodiments below.

Embodiment 1

A method of screening for a compound capable of modulating gene expression, comprising:
1) calculating the existence probability of a local secondary structure that may exist in a target RNA sequence,
2) selecting a local secondary structure with the desired existence probability,
3) preparing a screening probe corresponding to the selected local secondary structure, and
4) carrying out compound screening using the probe.

Embodiment 2

The method according to embodiment 1, wherein the local secondary structure is a structure comprising a stem loop and peripheral sequences contiguous to its 5' and 3' ends.

Embodiment 3

The method according to embodiment 2, wherein the peripheral sequences contiguous to the 5' and 3' ends are each 0-10 bases in length, preferably 3-6 bases in length.

Embodiment 4

The method according to embodiment 2 or 3, wherein the stem-loop structure has a single loop region.

Embodiment 5

The method according to any one of embodiments 2-4, wherein the stem-loop structure has two or more stem portions and a wobble portion with no complementarity between the stems.

Embodiment 6

The method according to any one of embodiments 2-5, wherein the compound capable of modulating gene expression is one that can interact with a substructure of a local secondary structure.

Embodiment 7

The method according to any of embodiments 2-6, wherein the compound capable of modulating gene expression can interact with any or more of the peripheral sequences contiguous to the 5' and 3' ends, loop portion or wobble portion of the stem-loop structure, stem moiety, minor groove of the duplex, or base pairs at the end of the stem.

Embodiment 8

The method according to any one of embodiments 1-7, wherein the sequence capable of adopting a local secondary structure exists within a region consisting of a 5' untranslated region and a coding region in the target RNA sequence.

Embodiment 9

The method according to any one of embodiments 1-7, wherein the sequence capable of adopting a local secondary structure exists within a region consisting of a translation initiation site and its vicinity in the target RNA sequence.

Embodiment 10

The method according to any one of embodiments 1-9, wherein control of translation of the target RNA sequence is effective in preventing or treating one or more diseases.

Embodiment 11

The method according to any one of embodiments 1-10, wherein the compound screening step comprises contacting a probe with the compound to measure a stability change in the secondary structure of the probe.

Embodiment 12

The method according to any one of embodiments 1-11, wherein the probe is a FRET probe.

Embodiment 13

The method according to embodiment 12, wherein the probe has a stem-loop structure.

Embodiment 14

The method according to embodiment 12, wherein the probe consists of two nucleic acid strands that are at least partially complementary to each other.

Embodiment 15

The method according to embodiment 13 or 14, wherein the probe has a base that does not form a complementary strand adjacent to the end of the stem portion.

Embodiment 16

The method according to embodiment 13, 14 or 15, wherein the probe comprises a set of a fluorescent molecule and a quencher molecule.

Embodiment 17

The method according to any one of embodiments 1-16, wherein the compound screening process comprises a step of placing mixture of probes in one well to contact the mixture of probes with the compound to measure a stability change in the secondary structure of the probe.

Embodiment 18

The method according to any one of embodiments 1-17, wherein mixture of compounds are placed in one well to perform screening of the compounds.

Embodiment 19

The method according to any one of embodiments 12-18, wherein the change in stability of the secondary structure is measured by measuring fluorescence of the FRET probe.

Embodiment 20

The method according to any one of embodiments 1-19, wherein calculating the existence probability of a local secondary structure comprises:
i) a step of predicting structure, comprising setting frame n having the width of W bases by an increment of R bases starting from the 5' terminal, wherein the number of frames obtained from a target RNA is nmax, computing the base-pair pattern which can be obtained by pattern matching for the constituent base sequence of the W bases in each frame n, applying thermodynamic stability calculations to the result, and giving ΔG for each base-pair pattern,
ii) a step of analyzing structure, comprising hypothesizing based on the resulting mmax(n) structures predicted in frame n and respective energy level, that the state inside the cell within which the RNA is placed is in equilibrium, calculating the existence probability of each resulting predicted structure according to the Maxwell-Boltzmann statistics, wherein the existence probability of each predicted structure result is j(n,m) for the mth predicted result from the most stable structure among the resulting predicted structures in frame n;
iii) a step of calculating local existence probability, comprising setting p as a property profile of a loop and stem (characteristics of the stem loop defined by the position of base in the stem-constituting base pair) formed beginning from the absolute position x on the sequence rather than in the frame, and defining the stem-loop as motif(x, p), and defining the existence probability in frame n of the motif (x,p) as partial existence probability P_local (x,p,n), and calculating the value as sum Σj (n,m) of the j values for the prediction results of structures in which the stem loop exists among all the resulting predicted structures obtained in the frame n, wherein the local existence probability P_local (x,p,n) of motif (x,p) in the frame n is represented below:

$$\text{P\_local}(x, p, n) = \sum_{m=1}^{mmax(n)} \begin{cases} 0 & \text{if motif } (x, p) \text{ is not found in the } mth \text{ structure of frame } n \\ j(n, m) & \text{if motif } (x, p) \text{ is found in the } mth \text{ structure of frame } n \end{cases}$$

iv) a step of calculating existence probability, comprising giving the existence probability P_global (x,p) of motif (x,p) among the entirety as ΣP_local (x,p,n)/n_all (x,p) when ΣP_local (x,p,n) is the result of sum of P_local (x,p,n) from frame 1 to nmax, and the number of frames in which the full length of the sequence constituting the stem-loop motif (x, p) is contained is n_all (x,p), wherein the existence probability P_global (x, p) of motif (x,p) among the entirety is represented as below, and $$\text{P\_global}(x, p) = \sum_{n=1}^{nmax} \frac{\text{P\_local}(x, p, n)}{\text{n\_all}(x, p)}$$

v) a step of analyzing, comprising selecting a stem-loop based on the existence probability and property p, with respect to the obtained existence probability P_global (x,p) of motif (x, p).

Embodiment 21

The method according to any one of embodiments 1-20, wherein the desired existence probability is 70% or more, 75% or more, 80% or more, 85% or more, 90% or more, or 95% or more.

BRIEF DESCRIPTION OF THE DRAWINGS

FIG. 1 illustrates an example of a probe usable in the present invention. The native-type probe has a fluorescent molecule and a quencher molecule linked to each end of the stem portion of the stem-loop structure. The native+-type probe is linked to each end of the stem portion of the stem-loop structure with a fluorescent molecule and a quencher molecule via a few of bases that do not form a stem. The hetero-type probe does not have a loop portion and is formed by hybridization of two nucleic acid strands with a fluorescent molecule and a quencher molecule linked to the terminal end (those on the 5' side of the original native-type probe are referred to as cis5, and those on the 3' side are referred to as cis3).

FIG. 2 is a graph showing the results of Tm measurement in the presence or absence of kanamycin (kanamycin) for each probe (Alexa Fluor 647 label) described in Table 4.

FIG. 3 is a graph showing the results of Tm measurement in the presence or absence of kanamycin (kanamycin) for each probe (Cy5 label) described in Table 4.

FIG. 4 is a graph showing the results of Tm measurement in the presence or absence of kanamycin (kanamycin) for each probe (6-FAM label) described in Table 4.

FIG. 5 is a graph showing the results of Tm measurement in the presence or absence of kanamycin or CPFX (ciprofloxacin) for each single probe described in Table 6.

FIG. 6 is a graph showing the results of Tm measurement in the presence or absence of kanamycin or CPFX for mixtures of the four probes described in Table 6.

FIG. 7 shows the chemical structure of KG022.

MODE FOR CARRYING OUT THE INVENTION

As mentioned above, the present inventors intended to regulate protein expression from the target mRNA by thermodynamically stabilizing the intrinsic substructure of the target RNA (such as mRNA), for example, to inhibit formation of the initiation complex, trigger ribosomal stalling or cleavage by endo-nucleases or to inhibit degradation by exo-nucleases, or to induce rapid mRNA degradation by the mRNA quality-control mechanism (no-go decay), which degrades mRNA from which the translation elongation reaction has stopped prematurely. Since its thermodynamic stabilization is carried out with low-molecular-weight compounds, the first step is to discover a suitable substructure to which a low-molecular-weight compound can bind at an appropriate position. RNA probes are then designed in a system that can be detected to properly stabilize their substructures, characterized, and used in the evaluation system to obtain low-molecular-weight compounds that bind. The present invention is based on such a technique developed by the present inventors, and the present invention is described in detail below.

1) Process of Calculating the Existence Probability of a Substructure in a Target RNA Sequence In some embodiments of the present invention, the step of calculating the existence probability of a substructure in the target RNA sequence comprises:

i) a step of predicting structure, comprising setting frame n (n is an integer of 1 or more) having the width of W bases (W is an integer of 1 or more, for example, from 100 to 500, preferably 300) by an increment of R bases (R is an integer of 1 or more, for example, from 1 to 10, preferably 3 as same as the codon base number) from the 5' terminal, wherein the number of the resulting frames is nmax from the target RNA (nmax is an integer of 1 or more, depending on the length of the target RNA and other parameters), computing the base-pair pattern which can be obtained by pattern matching for the constituent base sequence of the W bases in each frame n, applying known thermodynamic stability calculations to the result, and giving ΔG for each base-pair pattern, ii) a step of analyzing structure, comprising hypothesizing based on the resulting mmax(n) structures predicted in frame n and respective energy level, that the state inside the cell within which the RNA is placed is in equilibrium, calculating the existence probability of each resulting predicted structure according to the Maxwell-Boltzmann statistics, wherein the existence probability of each predicted structure result is j(n,m) for the mth predicted result from the most stable structure among the resulting predicted structures in frame n;

iii) a step of calculating local existence probability, comprising setting p as a property profile of a loop and stem (characteristics of the stem loop defined by the position of base in the stem-constituting base pair) formed beginning from the absolute position x on the sequence rather than in the frame, and defining the stem-loop as motif(x, p), and defining the existence probability in frame n of the motif (x,p) as partial existence probability P_local (x,p,n), and calculating the value as sum Σj (n,m) of the j values for the prediction results of structures in which the stem loop exists among all the resulting predicted structures obtained in the frame n, wherein the local existence probability P_local (x,p,n) of motif (x,p) in the frame n is represented below:

$$P\_local(x, p, n) = \sum_{m=1}^{mmax(n)} \begin{cases} 0 & \text{if motif } (x, p) \text{ is not found in the } m\text{th structure of frame } n \\ j(n, m) & \text{if motif } (x, p) \text{ is found in the } m\text{th structure of frame } n \end{cases}$$

iv) a step of calculating existence probability, comprising giving the existence probability P_global (x,p) of motif (x,p) among the entirety as ΣP_local (x,p,n)/n_all (x,p) when ΣP_local (x,p,n) is the result of sum of P_local (x,p,n) from frame 1 to nmax, and the number of frames in which the full length of the sequence constituting the stem-loop motif (x, p) is contained is n_all (x,p), wherein the existence probability P_global (x, p) of motif (x,p) among the entirety is represented as below, and $$P\_global(x, p) = \sum_{n=1}^{nmax} \frac{P\_local(x, p, n)}{n\_all(x, p)}$$

v) a step of analyzing, comprising selecting a stem-loop based on the existence probability and property p, with respect to the obtained existence probability P_global (x,p) of motif (x, p).

Herein, thermodynamic stability calculations can be calculated using known methods, for example, with reference to descriptions in the documents below.

1: Mathews et al, J. Mol. Biol. (1999) 288, 911-940.
2: Xia T et al, Biochemistry (1998) 37, 14719-14735.
3: Giese M R et al, Biochemistry (1998) 37, 1094-1100.
4: Draper D E et al, Methods in Enzymology (1995) 259, 281-242.
5: Serra M J et al, Methods in Enzymology (1995) 259, 242-261.

2) Process of Selecting an Appropriate Target Substructure vi) Existence probability calculations of the above substructures are performed separately using two or more types of structure prediction software (algorithm). Any of mfold, UNAFold, Sfold, CentroidFold, vsfold, and RNAfold may be used as the structural prediction software, but it is desirable to have different background theories for prediction as much as possible. For example, UNAFold (available on http://unafold.rna.albany.edu/) historically used as a successor software to mfold, and Vsfold (revised Vswindow for continuous usage) which uses the CLE theory to eliminate biochemical parameters as much as possible (available on http://www.rna.it-chiba.ac.jp/) can be used. Two or more structure prediction software are utilized to obtain a list of intrinsic substructures each.

In general, structure prediction software predicts structure through several steps. The first step is mathematical pattern matching. Methods of pattern matching include dynamic programming, hidden Markov models, stochastic sampling, and stochastic context-free grammar. In the method of the present invention, any combination of these techniques can be used.

For structure prediction, the following references may be referred to:

Markham, N. R. & Zuker, M. (2005) DINAMelt web server for nucleic acid melting prediction. Nucleic Acids Res., 33, W577-W581;

Markham, N. R. & Zuker, M. (2008) UNAFold: software for nucleic acid folding and hybridization. In Keith, J. M., editor, Bioinformatics, Volume II. Structure, Function and Applications, number 453 in Methods in Molecular Biology, chapter 1, pages 3-31. Humana Press, Totowa, NJ ISBN 978-1-60327-428-9.)

Dawson W, Fujiwara K, Kawai G, Futamura Y, & Yamamoto K. (2006) A method for finding optimal RNA secondary structures using a new entropy model (vsfold). Nucleosides Nucleotides Nucleic Acids. 25 (2):171-89.

Ping Ge and Shaojie Zhang, (2015) Computational analysis of RNA structures with chemical probing data. Methods, June 1; 0: 60-66.

vii) From each list, an intrinsic substructure with a sufficiently high existence probability is extracted, and a selection list is created for each. The threshold for the existence probability may be empirically 85% used by the present inventors, and it can be higher or lower. The threshold can be, for example, a value within the range of 35-90%, for example, 35%, 40%, 45%, 50%, 55%, 60%, 65%, 70%, 75%, 80%, 85%, or 90%. A separate threshold may also be used for each selection list.

viii) Here, the substructures commonly found in each selection list are listed as common structures. Here, a commonly discovered structure is a stem loop having a single loop (also called Single Stemloop=SSL), and is a structure having the features below.

A) The starting and terminating positions on the mRNA of each structure are identical.

B) One structure lies within another.

C) The base pair constitutions are almost identical, with some differences at both ends of the stem.

The common structures adopt the greatest common factor of these features.

ix) The common list should be narrowed down and targeted according to the expression regulation mechanism to be initiated. For example, if directed to knockdown, the target list is formed in terms of inhibition of the formation of the initiation complex of translation, by extracting the substructure within 50 bases before and after the start codon. If directed to induce no-go decay from ribosomal stalling, the target list is formed by extracting substructures that extend from the 5' end of mRNA to the termination codon and 50 bases downstream from the termination codon. Alternatively, if directed to cause inhibition of exonuclease degradation and up-regulation, the target list is formed by extracting the partial structures across 3'UTR.

x) The target list may be narrowed down with further evaluation. Specifically, each substructure is predicted and its thermodynamic stability is made an indicator, the existence probability value is made an indicator, the absence of structure or sequence similar to other genes is made an indicator, or the presence of structure or sequence similar to genes of other species is made an indicator.

3) Process of Designing Probes to be Used for Screening of the Selected Substructures Probes are prepared to find low-molecular-weight compounds that bind to the RNA substructures listed on the target list. For this, multiple types of probes are designed separately.

Native: specific RNA substructures are extracted intact.

Native+: Native plus x residues just before and y residues immediately after a particular RNA substructure in the 5'- and 3'-targeting mRNA as the 5' end and the 3' end, respectively. The entire Native+ sequence corresponds to x bases before a particular RNA structure on mRNA to y bases after the particular RNA substructure. Usually, it should be at least 3 bases and up to about 5 bases for x and y.

Stem+: two strands of the remaining part of Native+ after deletion of the loop portion.

For these, a fluorescent substance is added to the 5' side, and a quencher is added to the 3' side (or vice versa) to make a Native probe, a Native+ probe, and a Stem+ probe. Here, instead of the Stem+ probe, a Hetero+ probe, which is two molecules after deletion of the loop portion of the Native+ probe may be used.

In addition, when the distance between the fluorescent substance and the quencher is less than 20 bases, fluorescence becomes very weak; thus, direct labeling to the Native probe is not preferable. In addition, in the Native+ probe, x and y are appropriately lengthened, preferably more than 20 bases in total.

For these, dummy probes (Native dummy probe, Native+ dummy probe, Stem+ dummy probe, Hetero+ dummy probe) with no fluorescent substance are prepared in advance, and Tm values are measured by UV measurement. It should be confirmed that only one major Tm value is detected at this time.

4) Screening Processes for Low-Molecular-Weight Compounds

1) For probes (Native probe, Native+ probe, Stem+ probe, Hetero+ probe), the Tm value is measured by the output of the fluorescent intensity in a state of contact with the compound. The difference in Tm value between this Tm value and that when a probe is not contacted with the compound is defined as ΔTm, and is used as an indicator of the effect that the compound contributes to stabilization. Alternatively, from the temperature and fluorescent output graph used for the Tm value calculations, ΔH and ΔS at the Tm value may be calculated using van't Hoff equation and Lambert-Beer rule with some assumptions, and converted to ΔG at room temperature, which may be used as the ΔΔG value difference from that when the probe is not contacted with the compound. It may be uniformly used as an indicator for assessment of the stabilizing effect regardless of the Tm value.

At this time, it is assessed that for (1) Native probe, (2) Native+ probe, (3) Stem+ probe (or Hetero+ probe), the change in the Tm value of (1)(2) is likely to have been attached to the loop portion of the substructure, the change in the Tm value of (2)(3) is likely to have been attached to the root portion of the substructure, and the change in the Tm value of (1)(2)(3) is likely to have been attached to the stem portion of the substructure; and the desired low-molecular-weight compound is selected.

2) In addition, since each well in a qPCR machine (e.g., manufactured by CFX 384 Touch (Bio-Rad Co., Ltd.) can be simultaneously measured for fluorescence at four wavelengths, the screening can be efficiently performed by mixing and using probes of different fluorescence wavelengths with the FRET label in one well. In that case, for the fluorescent label and quencher, a labeled probe can be synthesized by selecting from combinations in the table below. For example, it is also possible to mix four or more types of FRET probes by simultaneously mixing probes having different probe species or RNA sequences. For example, even with probes detected at the same wavelength, if the Tm values are sufficiently far apart (e.g., 20° C. or higher) and there is no difference in fluorescence intensity, the respective Tm values can be calculated even when mixed.

TABLE 1

| Fluorescent labeling compound name | Quencher compound name |
|---|---|
| 6-FAM | Iowa Black FQ |
| MAX (NHS Ester) | Iowa Black RQ |
| TYE 563 | BHQ 1 |
| TEX 615 | BHQ 2 |
| TYE 665 | Dabcyl |
| TYE 705 | TAMRA |
| Alexa Fluor 488 (NHS Ester) | |
| Alexa Fluor 532 (NHS Ester) | |
| Alexa Fluor 546 (NHS Ester) | |
| Alexa Fluor 594 (NHS Ester) | |
| Alexa Fluor 647 (NHS Ester) | |
| Alexa Fluor 660 (NHS Ester) | |
| Alexa Fluor 750 (NHS Ester) | |
| Cy3 | |
| Cy5 | |
| Cy5.5 | |
| 6-FAM (Azide) | |
| 6-FAM (NHS Ester) | |
| Fluorescein dT | |
| JOE (NHS Ester) | |
| TET | |
| HEX | |
| ATTO 488 (NHS Ester) | |
| ATTO 532 (NHS Ester) | |
| ATTO 550 (NHS Ester) | |
| ATTO 565 (NHS Ester) | |
| ATTO Rho101 (NHS Ester) | |
| ATTO 590 (NHS Ester) | |
| ATTO 633 (NHS Ester) | |
| ATTO 647N (NHS Ester) | |
| Rhodamine Green-X (NHS Ester) | |
| Rhodamine Red-X (NHS Ester) | |
| TAMRA (NHS Ester) | |
| TAMRA (Azide) | |
| ROX (NHS Ester) | |
| TEXAS RED-X (NHS Ester) | |
| Lightcycler 640 (NHS Ester) | |
| Dy750 (NHS Ester) | |

In this case, it is also possible to evaluate the compound to be evaluated by mixture of probes having different fluorescence wavelengths in one well.

Target RNA

Target RNAs are RNAs, specifically mRNAs, of genes of interest (target genes) that suppress or abolish their expression, and they may be ncRNA. Also, target RNAs include RNAs from the nuclear genome, RNAs from the mitochondrial genome, RNAs from the viral or bacterial genome, and such. Suppression of the expression of a target gene involves reducing the amount of protein transcriptionally synthesized from that gene to 25% or less, preferably 50% or less, preferably 75% or less, and preferably 95% or less. A target gene is a gene whose suppression or loss of expression is of industrial value, especially a gene whose increased expression is responsible for a particular disease (hereafter referred to as a pathogenic gene). Examples of such disease causing genes include, for example, ras, erbb2, myc, apc, brca1, Rb, Bcl-2, BGEF oncogenes, genes involved in hypertension such as renin, diabetes-related genes such as insulin, hyperlipidemia-related genes such as LDL-receptor, obesity-related genes such as leptin, arteriosclerosis disease-related genes such as angiotensin, apolipoproteins and presenilins known to be responsible for dementia, and genes related to senescence. These genes and their mRNA sequences are available on public databases (NCBI nucleotide database, etc.)

Hereinafter, the present invention will be specifically described with reference to the Examples, but the present invention is not limited thereby.

EXAMPLES

Example 1: Process of Calculating the Existence Probability of a Substructure in a Target RNA Sequence The mRNA sequence information of Survivin (Accession No.: NM_0001168.2) was retrieved from the NCBI database. Based on the sequence data, a 300-base-wide frame was set at 3 nucleotides from the 5' end (The first frame ranges from base 1 (base 1) to base 300 at the 5' end and the second frame ranges from base 4 to base 303. The same applies below. nmax frames are provided.). In each frame, structure predictions based on pattern matching and thermodynamic stability were made for the base sequence of 300 constituting bases (Here, UNAFold and Vswindow were first used. For UNAFold, see the following two references: 1) Markham, N. R. & Zuker, M. (2005) DINAMelt web server for nucleic acid melting prediction. Nucleic Acids Res. 33, W577-W581; 2) Markham, N. R. & Zuker, M. (2008) UNAFold: software for nucleic acid folding and hybridization. In Keith, J. M. editor, Bioinformatics, Volume II. Structure, Function and Applications, number 453 in Methods in Molecular Biology, chapter 1, pages 3-31. Humana Press, Totowa, NJ ISBN 978-1-60327-428-9). For vsfold, which is the core of Vswindow, see the following reference: 3) Dawson W, Fujiwara K, Kawai G, Futamura Y, & Yamamoto K. (2006) A method for finding optimal RNA secondary structures using a new entropy model (vsfold). Nucleosides Nucleotides Nucleic Acids. 25 (2):171-89.) From the predicted structure results obtained and their respective energies, the existence probability was calculated for each predicted structure result, assuming that the cellular state where mRNA is located is in equilibrium. Here, for the mth prediction result from the most stable structure among the structure prediction results in the n frame (in frame n, the prediction structure result obtained is mmax (n)) and its existence probability is set as j(n,m).

Here, the substructure found in each of the structure prediction results, consisting of only one loop site and one stem having complementarity only with each other, is defined as the stem-loop structure (The term "complementarity with each other" for the stem loop does not mean that it doesn't constitute any other stem loop even in other prediction structure frames, but means that it doesn't include another stem loop in a single prediction structure result). Here, the stem may contain mismatches (opposing non-paired bases in the stem) or bulges (non-paired bases in the stem which are not opposing to each other), but both ends should form base pairs. In addition, a stem loop enclosed by the stem loop is also considered as a separate stem loop (e.g., the unfolded base pair farthest from the stem loop is considered as an unresolved, separate stem loop). In addition, the loop portion is one stem loop and it is designated as single stem loop (hereafter, abbreviated as SSL).

These SSLs are called motif(x,p) when they start with the absolute position x on the sequence rather than in the frame and the informational profile of the constituting loops and stems (SSL identity defined by the position of the base pairs that make up the stem) is set as p. Then, the existence probability within the frame n of motif (x,p) is set as partial existence probability P_local (x,p,n), and the value is the sum of j values for the structure for which the SSL exists in the structure prediction results obtained in the n frame, i.e., the ωj(n,m). Further, when the sum of frames 1 to nmax is taken for P_local(x,p,n) and the total length of arrays comprising the SSL is set to n_all(x,p), the existence probability P_global(x,p) of motif(x,p) in the whole is expressed as λP_local(x,p,n)/n_all(x,p).

Based on the predicted results by UNAFold, there were nine SSL structures with P_global(x,p) of more than 85%, excluding overlaps. Here, overlap means that if one SSL is a partial structure of another SSL, the smaller one is eliminated as an overlap.

Table 2 below shows the nine SSLs.

TABLE 2

| SSL | START | SEQUENCE | END |
|---|---|---|---|
| 1 | 107 | GGUGGCGGCGGCGGCAUGGGUGCCCCGACGUUGCC | 141 |
| 2 | 151 | GCAGCCCUUUCUCAAGGACCACCGCAUCUCUACAUUCAAGAACUG GCCCUUCUUGGAGGGCUGC | 214 |
| 3 | 235 | GGCCGAGGCUGGCUUCAUCCACUGCCCCACUGAGAACGAGCCAGA CUUGGCC | 286 |
| 4 | 381 | UUUCUGUCAAGAAGCAGUUUGAAGAAUUAACCCUUGGUGAAUUU UGAAACUGGACAGAGA | 441 |
| 5 | 794 | GGGGCUCAUUUUGCUGUUUUGAUUCCC | 821 |
| 6 | 1420 | GUGGGGGACUGGCUGGGCUGCUGCAGGCCGUGUGUCUGUCAGCC CAACCUUCACAUCUGUCACGUUCUCCAC | 1491 |
| 7 | 1540 | GCAGCUCCCGCAGGGUGAAGUCUGGCGUAAGAUGAUGGAUUUG AUUCGCCCUCCUCCCUGUCAUAGAGCUGC | 1612 |
| 8 | 1954 | UUUCCCUCUAAACUGGGAGA | 1973 |
| 9 | 2241 | GGCCUUUCCUUAAAGGCC | 2258 |

In Table 2, SSL 1-9 correspond to SEQ ID NOS: 1-9, respectively.

Example 2: Process of Selecting the Appropriate Target Substructure

From the predicted results by UNAFold, there were nine SSL structures with P_global(x,p) of more than 85%, excluding overlaps. The present inventors searched for SSLs containing start codons that were suggested to have high knockdown efficiency by stabilization as a result of binding of low-molecular-weight compounds, and at 107th to 141st, an SSL structure (1) was identified with an existence probability of approximately 90%. "(",")" indicate the formation of base pairs, respectively.

```
                                        (SEQ ID NO: 10)
    ((UG(((G(((C((((UGGG))))))A)))UG))
    GGUGGCGGCGGCGGCAUGGGUGCCCCGACGUUGCC
```

Here, from the predicted results by Vswindow, there were 53 SSL structures with P_global(x,p) of 35% or more, excluding overlaps. From 101st to 148th, an SSL structure (2) was identified with an existence probability of approximately 40%.

```
                                        (SEQ ID NO: 11)
    (((((A((U((((((GC(((UGGG)))CCGA))))))))))))
    GGCAGAGGUGGCGGCGGCGGCAUGGGUGCCCCGACGUUGCCCCCUG
    CC
```

SSL(1) is enclosed in SSL(2), and the most structurally important loop site and nearby base pairing are maintained. In addition, base pairing around 107 and 141 is maintained. Although the prediction results between SSL(1) and SSL(2) do not completely agree, the results differ only at the internal loop site, one of the sites where the compound is most likely to bind, and thus SSL(1) and SSL(2) are substantially identical. In other words, it is essentially assumed that the substructure has a high existence probability in both methods. Therefore, this SSL was chosen as the probe site to be screened for Survivin, because 1) it is in the area of presumably high knockdown efficiency as a result of the binding of low-molecular-weight compounds, 2) the high existence probability was confirmed by analysis which uses key structural prediction software, and 3) its existence probability was also confirmed by secondary structure prediction software.

Example 3: Design of Probes to be Used for Screening of Selected Substructures The sequence of the model motif (SSL) selected in Example 2 above was determined as a probe sequence for finding a low-molecular-weight compound that binds thereto. For this, multiple types of probes were designed separately as follows.

First, as Native type, a sequence of SSL(1) with higher existence probability calculated with the main structural predictive software was adopted.

```
                                        (SEQ ID NO: 12)
    Survivin-native
    GGUGGCGGCGGCGGCAUGGGUGCCCCGACGUUGCC
```

In addition, 3 bases before the 5' end of SSL(1) and 3 bases behind 3' were added to Native at the 5' end and the 3' end, respectively.

```
                                        (SEQ ID NO: 13)
    Survivin-native + AGA
    GGUGGCGGCGGCGGCAUGGGUGCCCCGACGUUGCC CCC
```

In addition, a heterotypic form was prepared in which the stem sequence was deleted from the Survivin-native sequence.

```
                                        (SEQ ID NO: 14)
    Survivin-hetero
    Survivin-cis5+
    5'-AGAGGUGGCGGCGGCGGCA-3'
```

```
                                        (SEQ ID NO: 15)
    Survivin-cis3+
    5'-UGCCCCGACGUUGCCCCC-3'
```

For these, the Tm values were measured using an RNA strand that has not been introduced with a fluorescent dye and a quencher as a dummy probe and the UV value as an indicator, and they were measured to be 69.63° C., 72.35° C., and 53.43° C., respectively. Since the curve for calculating the Tm value was straight, and the Tm value was found to be adequate without exceeding 80° C., a Cy5 fluorescent dye was attached to the 5' side of the Native type and Native+ type, heterotypic cis5+, and a black hole quencher was attached to the 3' side of the Native type and Native+ type, heterotypic cis3+ by synthesis. The Tm of each probe was confirmed by the method below.

10 μl solutions were mixed to a final concentration of 50 nM RNA, 20 mM phosphate buffer (pH 7.0), 50 mM KCl, 1% DMSO, 0.1 μg/μl Bovine Serum Albumin (Takara Bio), or 0.05%-0.1% Tween 20, or 0.05%-0.1% Triton X-100 and incubated at room temperature for 10 minutes.

The above solutions were dispensed into a 384 well plate, and the plate was kept in a qPCR machine (manufactured by CFX 384 Touch (Bio-Rad Co., Ltd.) for 15 seconds after the temperature was raised to 95° C., which was rapidly cooled to 4° C. and kept for 2 minutes, and then kept at 25° C. for 5 minutes. Then, it was raised to over 95° C. about 40 minutes, and the fluorescence output was measured every 1° C. in 10 seconds. For numerical differentiation of the fluorescence output, a total of seven points from the measured temperature T to plus or minus 3° C. were approximated to a straight line by the least squares method, and the slope was defined as the slope (D1) at the point of the measured temperature T. Similarly, the value of D1 was again subjected to numerical differentiation in the same manner, and the slope (D2) at the point of the measured temperature T was obtained. Here, in parts where the D1 value was 10 or more, the measured temperature T_D1MAX was obtained with D1 at maximum. A total of seven points from this measured temperature T_D1MAX to plus and minus 3° C. were used to calculate the value of T_INF at Y=0 by setting X as T and Y as D2 when the seven points were actually approximated to the line by least squares, and this was set as the Tm_NO value. Here, as shown below, the concentrations ranged from 51.8° C. to 78.2° C., respectively. Usually, the Tm value is affected by the concentration, and thus this degree of difference from the dummy probe is judged not to be an issue.

TABLE 3

| | Fluorescent label | Quencher label | Tm |
|---|---|---|---|
| Survivin-native | Alexa Fluor 647 | BHQ2 | 78.2° C. |
| Survivin-native+ | Alexa Fluor 647 | BHQ2 | 74.7° C. |
| Survivin-hetero | Alexa Fluor 647 | BHQ2 | 51.8° C. |
| Survivin-native | Cy5 | BHQ2 | 77.6° C. |
| Survivin-native+ | Cy5 | BHQ2 | 77.3° C. |
| Survivin-hetero | Cy5 | BHQ2 | 52.1° C. |
| Survivin-native+ | 6-FAM | BHQ1 | 75.4° C. |

Example 4: Screening Processes for Low-Molecular-Weight Compounds

10 μl solutions were mixed and incubated for 10 minutes at room temperature, so that the concentration of kanamycin as a low-molecular-weight compounds was 100 μM compound, 50 nM RNA, 20 mM phosphate buffer (pH 7.0), 50 mM KCl, 1% DMSO, 0.1 μg/μl Bovine Serum Albumin (Takara Bio), or 0.05%-0.1% Tween-20, or 0.05%-0.1% Triton X-100.

The above solutions were dispensed into a 384 well plate, and the plate was kept in a qPCR machine (manufactured by CFX 384 Touch (Bio-Rad Co., Ltd.) for 15 seconds after the temperature was raised to 95° C., which was rapidly cooled to 4° C. and kept for 2 minutes, and then kept at 25° C. for 5 minutes. Then, it was raised to over 95° C. about 40 minutes, and the fluorescence output was measured every 1° C. in 10 seconds. For numerical differentiation of the fluorescence output, a total of seven points from the measured temperature T to plus or minus 3° C. were approximated to a straight line by the least squares method, and the slope was defined as the slope (D1) at the point of the measured temperature T. Similarly, the value of D1 was again subjected to numerical differentiation in the same manner, and the slope (D2) at the point of the measured temperature T was obtained. Here, in parts where the D1 value was 10 or more, the measured temperature T_D1MAX was obtained with D1 at maximum. A total of seven points from this measured temperature T_D1MAX to plus and minus 3° C. were used to calculate the value of T_INF at Y=0 by setting X as T and Y as D2 when the seven points were actually approximated to the line by least squares, and this was set as the Tm value in the presence of kanamycin. In addition, the difference (Tm−Tm_NO) in the Tm value (Tm_NO) between wells containing kanamycin and wells without it was acquired as ΔTm. This task was performed on the Native type, Native+ type, and hetero type, yielding ΔTm of 2.4° C. to 9.0° C., individually.

TABLE 4

| | Fluorescent label | Quencher label | Tm (w/o kanamycin) | Tm (with kanamycin) | Tm increase |
|---|---|---|---|---|---|
| Survivin-native | Alexa Fluor 647 | BHQ2 | 78.2° C. | 81.1° C. | 3.0° C. |
| Survivin-native+ | Alexa Fluor 647 | BHQ2 | 74.7° C. | 78.5° C. | 3.7° C. |
| Survivin-hetero | Alexa Fluor 647 | BHQ2 | 51.8° C. | 60.8° C. | 9.0° C. |
| Survivin-native | Cy5 | BHQ2 | 77.6° C. | 80.0° C. | 2.4° C. |
| Survivin-native+ | Cy5 | BHQ2 | 77.3° C. | 80.4° C. | 3.1° C. |
| Survivin-hetero | Cy5 | BHQ2 | 51.1° C. | 60.3° C. | 8.2° C. |
| Survivin-native+ | 6-FAM | BHQ1 | 75.4° C. | 78.9° C. | 3.5° C. |

Example 5: Mixing and Subjecting Multiple Probes to Screening

Four FRET probes with fluorescent modifications corresponding to four wavelengths detectable by a measuring device (CFX384 Touch manufactured by Bio-Rad) were prepared.

FRET probe with Cy5 at the 5' end and BHQ2 modification at the 3' end (SEQ ID NO: 16)
A-4-G_Cy5/BHQ2
GGAUGCUUACUCAGCGAUCC FRET probe with FAM at the 5' end and BHQ1 modification at the 3' end (SEQ ID NO: 17)
MGA-N_FAM/BHQ1
GGAUCCCGACUGGCGAGAGCCAGGUAACGAAUGGAUCC FRET probe with HEX-equivalent Alexa 532 at the 5' end and BHQ1 modification at the 3' end (SEQ ID NO: 18)
FMNA_Alexa532/BHQ1
GGCGUGUAGGAUAUGCUUCGGCAGAAGGACACGCC FRET probe with Texas Red at the 5' end and BHQ2 modification at the 3' end (SEQ ID NO: 19)
TAR21-G3_Texas Red/BHQ2
GGGUCUCUCUUCGGGGAACCC

TABLE 5

| Fluorescent dye | FAM | HEX (Alexa532) | Texas Red | Cy5 |
|---|---|---|---|---|
| Excitation wavelength (nm) | 495 | 538 (527) | 598 | 648 |
| Fluorescence wavelength (nm) | 520 | 555 (553) | 617 | 668 |
| Detector channel | 1 | 2 | 3 | 4 |
| Excitation wavelength (nm) | 450-490 | 515-535 | 560-590 | 620-650 |
| Detection wavelength (nm) | 515-530 | 560-580 | 610-650 | 675-690 |

The final levels were 50 nM RNA, 20 mM phosphate buffer (pH 6 5), 50 mM KCl, 1% DMSO, 0.1 µg/µl Bovine Serum Albumin (Takara Bio) or 0.05%-0.1% Tween-20, or 0.05%-0.1% Triton X-100 per probe. In addition, 10 µl solutions were mixed to make 100 µM compound if small compounds were included and incubated at room temperature for 10 minutes.

The solutions were dispensed into a 384 well plate, and the plate was kept in a qPCR machine (manufactured by CFX 384 Touch (Bio-Rad Co., Ltd.) for 15 seconds after the temperature was raised to 95° C., which was rapidly cooled to 4° C. and kept for 2 minutes, and then kept at 25° C. for 5 minutes. Then, it was raised to over 95° C. about 40 minutes, and the fluorescence output was measured every 1° C. in 10 seconds. For numerical differentiation of the fluorescence output, a total of seven points from the measured temperature T to plus or minus 3° C. were approximated to a straight line by the least squares method, and the slope was defined as the slope (D1) at the point of the measured temperature T. Similarly, the value of D1 was again subjected to numerical differentiation in the same manner, and the slope (D2) at the point of the measured temperature T was obtained. Here, in parts where the D1 value was 10 or more, the measured temperature T_D1MAX was obtained with D1 at maximum. A total of seven points from this measured temperature T_D1MAX to plus and minus 3° C. were used to calculate the value of T_INF at Y=0 by setting X as T and Y as D2 when the seven points were actually approximated to the line by least squares, and this was set as the Tm value. In addition, the difference (Tm−Tm_NO) in the Tm value (Tm_NO) between wells containing the compound and wells without it was acquired as ΔTm.

This work was carried out for single-probe wells and four-probe wells, respectively, to obtain the Tm and ΔTm values shown in Table 6 below. The increase in Tm was obtained at all wavelengths for both single probes and mixed probes in wells where kanamycin was present as a compound. Among the four probes, the Tm increase was obtained only at wavelengths corresponding to A-4-G_Cy5/BHQ2 for both single probes and mixed probes in wells with compound CPFX which raises Tm only at A-4-G_Cy5/BHQ2 (FIG. 5).

of compound KG022 which causes the Tm value rise in A-4-G_Cy5/BHQ2 and NDFX (nadifloxacin) which does not cause changes in the Tm value of Survivin-native+ and A-4-G_Cy5/BHQ2 was prepared.

The final levels were 50 nM RNA, 20 mM phosphate buffer (pH 6 5), 50 mM KCl, 1% DMSO, 0.1 µg/µl Bovine Serum Albumin (Takara Bio), or 0.05%-0.1% Tween-20, or 0.05%-0.1% Triton X-100. Further, if a low-molecular weight compound was included, 10 µl solutions were mixed to give 100 µM compound per compound and incubated at room temperature for 10 minutes.

The solutions were dispensed into a 384 well plate, and the plate was kept in a qPCR machine (manufactured by CFX 384 Touch (Bio-Rad Co., Ltd.) for 15 seconds after the temperature was raised to 95° C., which was rapidly cooled to 4° C. and kept for 2 minutes, and then kept at 25° C. for 5 minutes. Then, it was raised to over 95° C. about 40 minutes, and the fluorescence output was measured every 1° C. in 10 seconds. For numerical differentiation of the fluorescence output, a total of seven points from the measured temperature T to plus or minus 3° C. were approximated to a straight line by the least squares method, and the slope was defined as the slope (D1) at the point of the measured temperature T. Similarly, the value of D1 was again subjected to numerical differentiation in the same manner, and the slope (D2) at the point of the measured temperature T was obtained. Here, in parts where the D1 value was 10 or more, the measured temperature T_D1MAX was obtained with D1 at maximum. A total of seven points from this measured temperature T_D1MAX to plus and minus 3° C. were used to calculate the value of T_INF at Y=0 by setting X as T and Y as D2 when the seven points were actually approximated to the line by least squares, and this was set as the Tm value. In addition, the difference (Tm−Tm_NO) in the Tm value (Tm_NO) between wells containing the compound and wells without it was acquired as ΔTm.

The ΔTm of Survivin-native+ probe in the presence of KG022 was 0.1° C., the ΔTm in the presence of NDFX was 0.0° C., and the ΔTm in the presence of KG022 and NDFX

TABLE 6

|  | No compound | | +kanamycin | | +CPFX | | ΔTm (° C.) | |
|---|---|---|---|---|---|---|---|---|
|  |  |  |  |  |  |  | Single | Single |
|  | Tm (° C.) | SD | Tm (° C.) | SD | Tm (° C.) | SD | +kanamycin | +CPFX |
| Single probe | | | | | | | | |
| A-4-G_Cy5/BHQ2 | 67.37 | 0.10 | 71.66 | 0.12 | 68.78 | 0.04 | 4.29 | 1.41 |
| MGA-N_FAM/BHQ1 | 73.71 | 0.12 | 80.33 | 0.21 | 74.03 | 0.19 | 6.62 | 0.33 |
| FMNA_Alexa532/BHQ1 | 77.94 | 0.08 | 82.17 | 0.10 | 78.03 | 0.07 | 4.23 | 0.09 |
| TAR21-G3_Texas Red/BHQ2 | 85.72 | 0.06 | 90.02 | 0.07 | 85.80 | 0.20 | 4.30 | 0.07 |
| 4-probe mixture | | | | | | | | |
| Cy5 detection | 67.50 | 0.13 | 71.78 | 0.11 | 68.96 | 0.13 | 4.28 | 1.46 |
| FAM detection | 74.11 | 0.06 | 80.22 | 0.05 | 74.22 | 0.14 | 6.11 | 0.11 |
| HEX detection | 78.08 | 0.05 | 82.23 | 0.07 | 78.07 | 0.01 | 4.15 | −0.02 |
| Texas Red detection | 85.77 | 0.16 | 89.95 | 0.10 | 85.75 | 0.19 | 4.18 | −0.02 |

Example 6: Mixing Compounds to Perform Screening

A-4-G_Cy5/BHQ2 probe and the Survivin-native+ type probe modified with Cy5 at the 5' end and BHQ2 at the 3' end were prepared as shown in Examples 2 and 5. A mixture was 0.1° C. For the A-4-G_Cy5/BHQ2 probe, the ΔTm in the presence of KG022 was 4.7° C., the ΔTm in the presence of NDFX was 0.2° C., and the ΔTm in the presence of KG022 and NDFX was 4.3° C. Equivalent ΔTm values were obtained in the presence of a single compound and compound mixture (Table 7, FIG. 6).

TABLE 7

| | ΔTm | | |
|---|---|---|---|
| | KG022 | NDFX | KG022 + NDFX |
| A-4-G | 4.65 | 0.15 | 4.31 |
| SV-NL | 0.08 | 0.01 | 0.06 |

The present specification shows the preferred embodiments of the present invention, and it is clear to those skilled in the art that such embodiments are provided simply for the purpose of exemplification. A skilled artisan may be able to make various transformations, and add modifications and substitutions without deviating from the present invention. It should be understood that the various alternative embodiments of invention described in the present specification may be used when practicing the present invention. Further, the contents described in all publications referred to in the present specification, including patents and patent application documents, should be construed as being incorporated the same as the contents clearly written in the present specification by their citation.

INDUSTRIAL APPLICABILITY

The method of the present invention is extremely useful in that it enables screening of low-molecular-weight compounds that are more advantageous in physical properties as nucleic acid-targeting pharmaceuticals; and not protein-targeting drug discovery, since the steps for obtaining a lead compound are all the same regardless of the disease of interest, it also shortens the time in drug discovery process, enabling efficiency and cost reduction. At the same time, large quantities of a drug discovery target for low-molecular-weight compounds that have been proven to be many pharmaceuticals in manufacturing process and regulatory process can be validated, which will lead to reliable provision of conventional pharmaceuticals for pharmaceutical targets that cannot be obtained by current drug discovery methods. Since the method is applicable to drug discovery for low-molecular-weight drugs targeting all RNAs that have specific structures and functions in the body, it is also very useful in drug discovery for functional RNAs such as miRNA, which have been suggested to play critical roles in gene expression control. In addition, the secondary structure search software used in the present invention can also be applied to detect novel miRNA on genomes. This technique is useful for the treatment or prevention of many diseases and disorders, as it can in principle be applied to the regulation of any gene expression.

The invention claimed is:

1. A method of screening for a compound capable of stabilizing a step-loop structure to control a function of a transcript of a target RNA among a compound to be evaluated, comprising:

calculating an existence probability of a local secondary structure comprising a stem-loop and peripheral sequences contiguous to its 5' and 3' ends that may exist in a target RNA sequence;

selecting a local secondary structure with a desired existence probability;

preparing a screening probe corresponding to the selected local secondary structure;

contacting the screening probe with the compound to be evaluated; and measuring an increase in stability of a stem-loop structure of the target RNA in the presence of the compound compared to in the absence of the compound, thereby identifying the compound as capable of stabilizing the stem-loop structure to control the function of the transcript of the target RNA, wherein calculating the existence probability of the local secondary structure comprises:

predicting a structure, comprising setting a frame n having the width of W bases by an increment of R bases starting from the 5' terminal, wherein a number of frames obtained from a target RNA is nmax, computing a base-pair pattern which can be obtained by pattern matching for a constituent base sequence of the W bases in each frame n, applying thermodynamic stability calculations to the result, and giving ΔG for each basepair pattern, analyzing the structure, comprising hypothesizing based on the resulting mmax(n) structures predicted in frame n and respective energy level, that the state inside the cell within which the RNA is placed is in equilibrium, calculating the existence probability of each resulting predicted structure according to the Maxwell-Boltzmann statistics, wherein the existence probability of each predicted structure result is j(n,m) for the mth predicted result from the most stable structure among the resulting predicted structures in frame n;

calculating a local existence probability, comprising setting pas a property profile of a loop and stem (characteristics of the stem loop defined by the position of base in the stem-constituting base pair) formed beginning from the absolute position x on the sequence rather than in the frame, and defining the stem-loop as motif (x, p), and defining the existence probability in frame n of the motif (x,p) as partial existence probability P_local (x,p,n), and calculating the value as sum Σj (n,m) of the j values for the prediction results of structures in which the stem loop exists among all the resulting predicted structures obtained in the frame n, wherein the local existence probability P_local (x,p,n) of motif (x,p) in the frame n is represented below:

$$P\_local(x, p, n) = \sum_{m=1}^{mmax(n)} \begin{cases} 0 & \text{if motif } (x, p) \text{ is not found in the } mth \text{ structure of frame } n \\ j(n, m) & \text{if motif } (x, p) \text{ is found in the } mth \text{ structure of frame } n \end{cases}$$

calculating the existence probability, comprising giving the existence probability P_global (x,p) of motif (x,p) among the entirety as ΣP_local (x,p,n)/n_all (x,p) when ΣP_local (x,p,n) is the result of sum of P_local (x,p,n) from frame 1 to nmax, and the number of frames in which the full length of the sequence constituting the stem-loop motif (x, p) is contained is n all (x,p), wherein the existence probability P_global (x, p) of motif (x,p) among the entirety is represented as below, and $$P\_global(x, p) = \sum_{n=1}^{nmax} \frac{P\_local(x, p, n)}{n\_all(x, p)}$$

analyzing, comprising selecting a stem-loop based on the existence probability and property p, with respect to the obtained existence probability P_global (x,p) of motif (x, p).

* * * * *

SEQUENCE LISTING

```
<160> NUMBER OF SEQ ID NOS: 19

<210> SEQ ID NO 1
<211> LENGTH: 35
<212> TYPE: RNA
<213> ORGANISM: Artificial Sequence
<220> FEATURE:
<223> OTHER INFORMATION: potentially stem-loop forming sequence

<400> SEQUENCE: 1
gguggcggcg gcggcauggg ugcccgacg uugcc                                35

<210> SEQ ID NO 2
<211> LENGTH: 64
<212> TYPE: RNA
<213> ORGANISM: Artificial Sequence
<220> FEATURE:
<223> OTHER INFORMATION: potentially stem-loop forming sequence

<400> SEQUENCE: 2
gcagcccuuu cucaaggacc accgcaucuc uacauucaag aacuggcccu ucuuggaggg       60
cugc                                                                   64

<210> SEQ ID NO 3
<211> LENGTH: 52
<212> TYPE: RNA
<213> ORGANISM: Artificial Sequence
<220> FEATURE:
<223> OTHER INFORMATION: potentially stem-loop forming sequence

<400> SEQUENCE: 3
ggccgaggcu ggcuucaucc acugccccac ugagaacgag ccagacuugg cc              52

<210> SEQ ID NO 4
<211> LENGTH: 61
<212> TYPE: RNA
<213> ORGANISM: Artificial Sequence
<220> FEATURE:
```

```
<223> OTHER INFORMATION: potentially stem-loop forming sequence

<400> SEQUENCE: 4
uuucugucaa gaagcaguuu gaagaauuaa cccuugguga auuuugaaa cuggacagag      60 a                                                                    61

<210> SEQ ID NO 5
<211> LENGTH: 28
<212> TYPE: RNA
<213> ORGANISM: Artificial Sequence
<220> FEATURE:
<223> OTHER INFORMATION: potentially stem-loop forming sequence

<400> SEQUENCE: 5
ggggcucauu uuugcuguuu ugauuccc                                       28

<210> SEQ ID NO 6
<211> LENGTH: 72
<212> TYPE: RNA
<213> ORGANISM: Artificial Sequence
<220> FEATURE:
<223> OTHER INFORMATION: potentially stem-loop forming sequence

<400> SEQUENCE: 6 guggggacu ggcugggcug cugcaggccg ugugucuguc agcccaaccu ucacaucugu     60
cacguucucc ac                                                       72

<210> SEQ ID NO 7
<211> LENGTH: 73
<212> TYPE: RNA
<213> ORGANISM: Artificial Sequence
<220> FEATURE:
<223> OTHER INFORMATION: potentially stem-loop forming sequence

<400> SEQUENCE: 7
gcagcucccg cagggcugaa gucuggcgua agaugaugga uuugauucgc ccuccuccu      60 gucauagagc ugc                                                      73

<210> SEQ ID NO 8
<211> LENGTH: 20
<212> TYPE: RNA
<213> ORGANISM: Artificial Sequence
<220> FEATURE:
<223> OTHER INFORMATION: potentially stem-loop forming sequence

<400> SEQUENCE: 8
uuucccucua aacugggaga                                                20

<210> SEQ ID NO 9
<211> LENGTH: 18
<212> TYPE: RNA
<213> ORGANISM: Artificial Sequence
<220> FEATURE:
<223> OTHER INFORMATION: potentially stem-loop forming sequence

<400> SEQUENCE: 9
ggccuuuccu uaaaggcc                                                  18

<210> SEQ ID NO 10
<211> LENGTH: 35
<212> TYPE: RNA
<213> ORGANISM: Artificial Sequence
<220> FEATURE:
<223> OTHER INFORMATION: potentially stem-loop forming sequence
```

<400> SEQUENCE: 10
gguggcggcg gcggcauggg ugccccgacg uugcc                          35

<210> SEQ ID NO 11
<211> LENGTH: 48
<212> TYPE: RNA
<213> ORGANISM: Artificial Sequence
<220> FEATURE:
<223> OTHER INFORMATION: potentially stem-loop forming sequence

<400> SEQUENCE: 11
ggcagaggug gcggcggcgg caugggugcc ccgacguugc ccccugcc            48

<210> SEQ ID NO 12
<211> LENGTH: 35
<212> TYPE: RNA
<213> ORGANISM: Artificial Sequence
<220> FEATURE:
<223> OTHER INFORMATION: potentially stem-loop forming sequence

<400> SEQUENCE: 12
gguggcggcg gcggcauggg ugccccgacg uugcc                          35

<210> SEQ ID NO 13
<211> LENGTH: 41
<212> TYPE: RNA
<213> ORGANISM: Artificial Sequence
<220> FEATURE:
<223> OTHER INFORMATION: potentially stem-loop forming sequence

<400> SEQUENCE: 13
agagguggcg gcggcggcau gggugccccg acguugcccc c                   41

<210> SEQ ID NO 14
<211> LENGTH: 19
<212> TYPE: RNA
<213> ORGANISM: Artificial Sequence
<220> FEATURE:
<223> OTHER INFORMATION: probe sequence

<400> SEQUENCE: 14
agagguggcg gcggcggca                                            19

<210> SEQ ID NO 15
<211> LENGTH: 18
<212> TYPE: RNA
<213> ORGANISM: Artificial Sequence
<220> FEATURE:
<223> OTHER INFORMATION: probe sequence

<400> SEQUENCE: 15
ugccccgacg uugccccc                                             18

<210> SEQ ID NO 16
<211> LENGTH: 20
<212> TYPE: RNA
<213> ORGANISM: Artificial Sequence
<220> FEATURE:
<223> OTHER INFORMATION: probe sequence

<400> SEQUENCE: 16
ggaugcuuac ucagcgaucc                                           20

<210> SEQ ID NO 17

```
<211> LENGTH: 38
<212> TYPE: RNA
<213> ORGANISM: Artificial Sequence
<220> FEATURE:
<223> OTHER INFORMATION: probe sequence

<400> SEQUENCE: 17
ggaucccgac uggcgagagc cagguaacga auggaucc                                38

<210> SEQ ID NO 18
<211> LENGTH: 35
<212> TYPE: RNA
<213> ORGANISM: Artificial Sequence
<220> FEATURE:
<223> OTHER INFORMATION: probe sequence

<400> SEQUENCE: 18
ggcguguagg auaugcuucg gcagaaggac acgcc                                   35

<210> SEQ ID NO 19
<211> LENGTH: 21
<212> TYPE: RNA
<213> ORGANISM: Artificial Sequence
<220> FEATURE:
<223> OTHER INFORMATION: probe sequence

<400> SEQUENCE: 19
gggucucucu ucggggaacc c                                                  21
```